Oct. 27, 1970  C. J. INGRAM  3,536,354
VEHICLE BODIES
Filed July 23, 1968  3 Sheets-Sheet 3
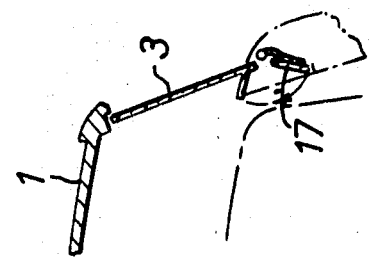
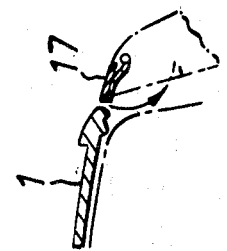
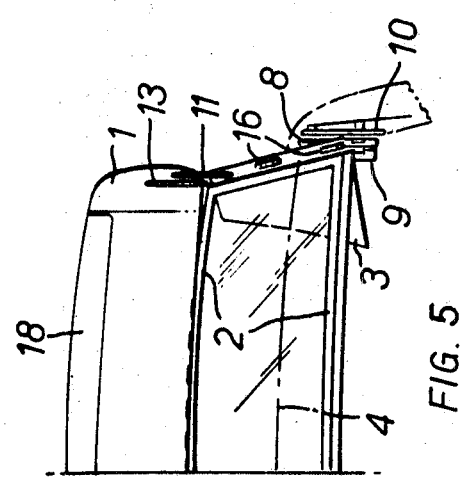
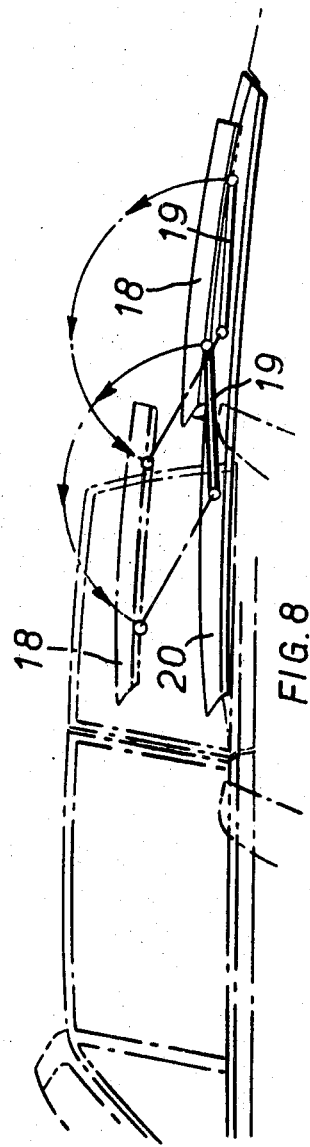
INVENTOR
CYRIL J. INGRAM
BY Semmes and Semmes
ATTORNEYS

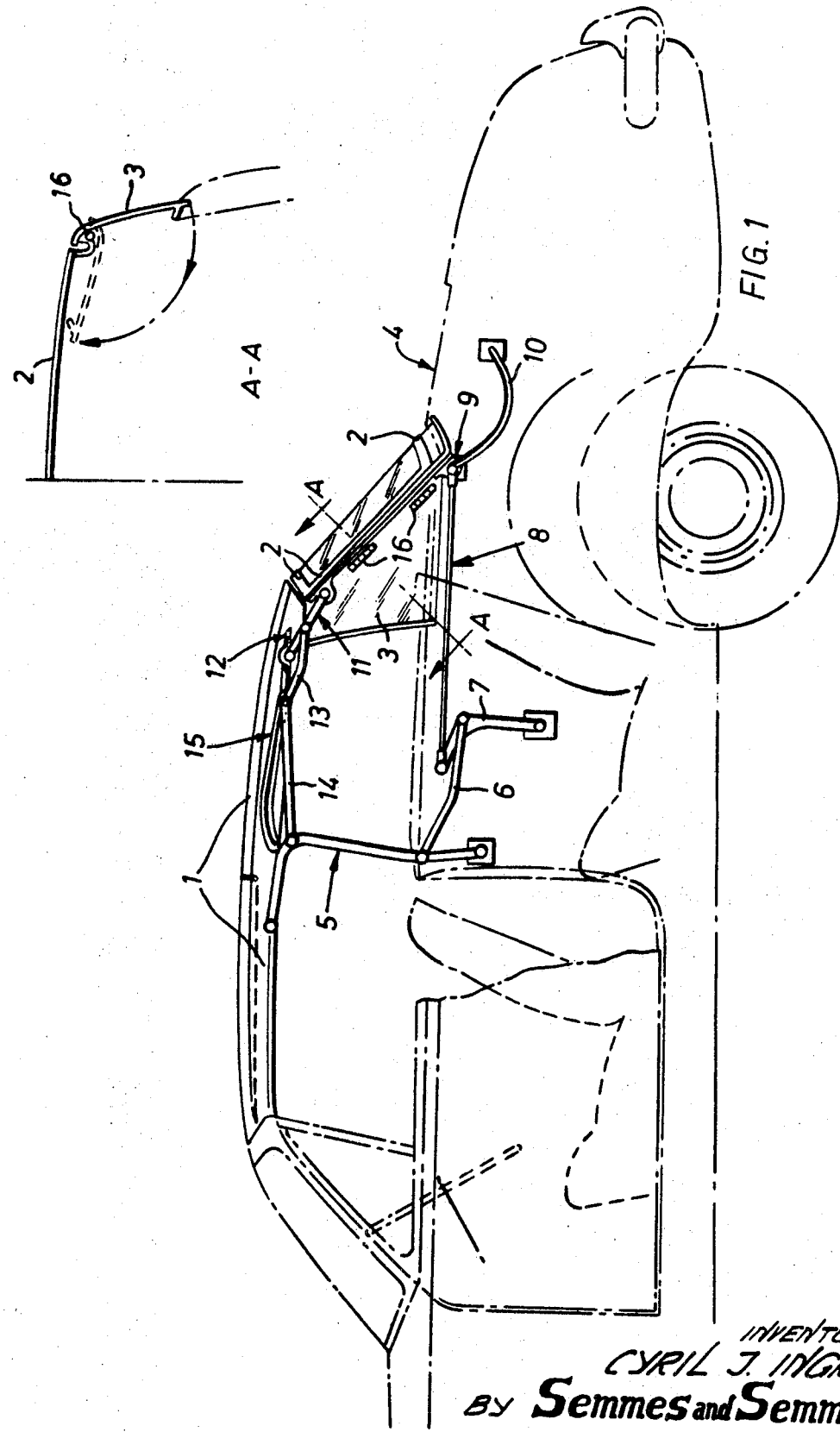

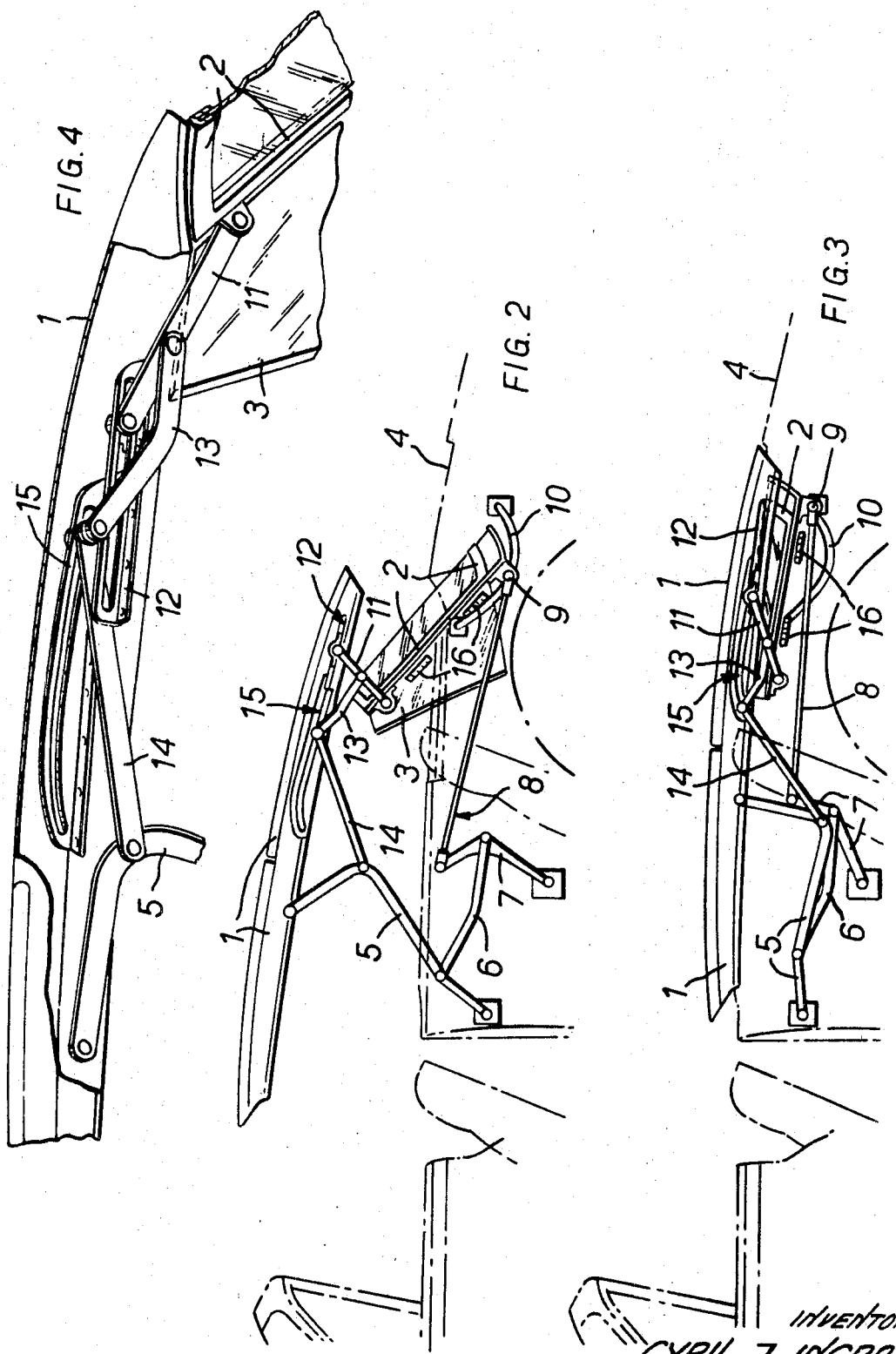

United States Patent Office 3,536,354
Patented Oct. 27, 1970.

3,536,354
VEHICLE BODIES
Cyril J. Ingram, North Harrow, England, assignor of forty percent to Ronald F. Sullivan, San Francisco, Calif.
Filed July 23, 1968, Ser. No. 746,931
Int. Cl. B60j 1/00
U.S. Cl. 296—147                                            3 Claims

ABSTRACT OF THE DISCLOSURE

A hard-top convertible automobile body has a roof and a rear window frame supported by a pivoted linkage so that the roof can swing down on to the rear of the body and the window frame can slide down below the lowered roof.

---

This invention relates to vehicle bodies and particularly, but not exclusively, so-called hard-top convertible automobile bodies. It will be apparent that the invention could be applied to other vehicle bodies such as power boats or light aircraft.

The invention comprises a vehicle body having an upper part which can be lowered to convert the body from a covered body to an open body, in which the upper part consists of at least two movable parts, respectively a roof and a rear window frame, the roof is supported on the lower part of the body by a pair of pivoted arms, so that the roof can swing rearwardly as a whole to rest on a rear part of the body, and the rear window frame is mounted on the lower part of the body to slide downwardly and rearwardly to a position beneath the lowered roof.

According to another feature of the invention, the rear window frame is linked to the roof-supporting pivoted arms so that, as the arms swing rearwardly they cause the rear window frame to slide downwardly and rearwardly, or vice versa.

In a preferred construction, the rear window frame is guided to slide in downwardly and rearwardly curved guide slots or the like so that, as it slides, the rear window frame can pass beneath the forward edge of the top panel of a luggage trunk, or like rearward deck part of the lower part of the vehicle body, to a stowed position beneath such trunk panel or like part. In such case the lowered roof extends closely over the trunk panel or like part.

Another feature of the invention consists in the provision of a pair of quarter panels between the sides of the rear window frame and the elbow rails, or equivalent parts, of the lower part of the body, each quarter panel being hinged to the respective side of the rear window frame, resting on the elbow rail when the rear window frame is raised and folding inwardly beneath and sliding downwardly and rearwardly with the rear window frame when the latter is lowered to a stowed position in which the quarter panel lies folded closely beneath the rear window frame.

According to a further feature of the invention, the forward part of the roof is made as a movable section, such as a rearwardly movable panel, so that, when the roof is lowered, the forward part can be moved to avoid the roof covering rear seats of a body having more than one row of seats.

The movable forward section of the roof also has the advantage that, when the roof is raised, it can be partly opened like a so-called sunshine roof.

The movement of the roof and rear window frame, with the quarter panels if provided, can be effected manually, such as by moving the roof, or can be power driven by an electric motor or hydraulic jack, for example, applied to any convenient lever member of the linkage between the roof and rear window frame or to the roof or the rear window frame itself.

The meeting edges of the roof, rear window frame and quarter panels are constructed to fit one against another, in a similar manner to vehicle door shuts, and sealing strip may be provided as required.

The invention is illustrated, by way of example, on the accompanying drawings, in which:

FIG. 1 is a side elevation of the linkage at one side of a hard-top convertible, two-door, automobile body in the raised or closed position, the associated parts of the body being shown in broken lines and a detail in half cross-section on the line A—A, FIGS. 2 and 3 are side elevations corresponding to FIG. 1, showing respectively a partly lowered position and a completely lowered, or stowed, position in which the automobile body is in the open condition of use, FIG. 4 is a fragmentary perspective view showing linkage at the further side of the body from that shown by FIGS. 1 to 3, FIG. 5 is a half-section rear view projected from FIG. 2, FIGS. 6 and 7 are fragmentary transverse sectional views showing a constructional detail, and FIG. 8 is a side elevation showing a roof constructional feature.

The parts of the body shown by the drawings are a roof 1, a rear window frame 2, one quarter panel 3, there being a corresponding quarter panel at the other side, and a trunk panel or rear deck part 4. Other body parts, such as the windscreen, doors and side windows and body panels, which are not essential to an understanding of the invention, are illustrated in broken lines.

The linkage as shown is duplicated, at the other side of the body, one side only being shown for clarity of illustration.

The roof 1 is carried by a pair of supporting arms 5 each pivoted by its lower end to the inside of the lower part of the body and by its upper end to the roof cant rail. With some body designs and proportions, the arms 5 might have sliding or link pivots. In the raised position of FIG. 1, the roof 1 meets the top rail of the windscreen.

Near its lower end, each arm 5 is connected by a pivoted link 6 to the angle of a cranked lever 7 pivoted by its lower end on the inside of the body. The linkage as so far described enables the roof 1 to swing rearwardly and downwardly, and return, followed in its movement by the cranked lever 7 or vice versa.

The upper end of each cranked lever 7 is pivoted to the forward end of a thrust rod 8 of which the rear end is pivoted to a lug 9, on the respective lower corner of the rear window frame 2, guided to slide along a curved guide 10 on the inside of the body.

At the top of each side, the rear window frame 2 is connected by a pivoted link 11 to a slotted plate 12 on the roof cant rail and a rule-jointed pair of links 13 and 14 interconnect the link 11 and supporting arm 5, the joint pin of the links 13 and 14 sliding in another slotted plate 15 on the cant rail.

The thrust rods 8 and links 11, 13 and 14 enable the rear window frame 2 to follow swinging movement of the roof 1, or vice versa, the rear window frame acting as a thrust member and being guided, by the guides 10, to pass under the forward edge and closely beneath the trunk panel 4.

Each side of the rear window frame 2 carries, by hinges 16, a quarter panel 3 which, on rearward movement of the linkage, folds inwardly beneath the rear window frame 2. The folding movement of each quarter panel can be effected by reaction against the upper border of the curved guides 10, or equivalent guides, and its hinging can be spring-loaded for either or both folding and unfolding movement or part of such movement.

The operation of the linkage as a whole can be seen from the successive positions illustrated from FIGS. 1 to 3 and 5 for lowering and in the reverse order for raising.

FIGS. 6 and 7 show a hinged flap 17 which is provided, at each side, to bridge a gap, between the roof 1 and the elbow rail or like part of the body-side, left by folding-away of the quarter panel 3 from the raised position (FIG. 7) to the lowered position (FIG. 6). Hinging movement of the flap 17 can be effected through the thrust rod 8.

Power operation can be effected by using any convenient member, such as the arms 5, links 6 or levers 7, as the driven member.

In a preferred construction, illustrated by FIG. 8, a forward section of the roof 1 comprises a panel 18 which is carried by a parallel-motion linkage 19 on the cant rails 20 so that the panel 18 can be lifted and swung rearwardly to rest on the rear part of the roof in the raised or in the lowered position.

What is claimed is:

1. A vehicle body having a lower part and an upper part which can be lowered on to said lower part to convert the body from a covered body to an open body, said upper part comprising a roof member and a relatively movable rear window frame member, in which supporting pivoted linkage means are provided including a pair of arms pivoted to and interconnecting the sides of said roof member and said lower part, said linkage supporting said roof member for swinging movement between a forward raised position and a rearward lowered position in which said roof member rests on said lower part, said rear window frame member is mounted on said lower part to move between a raised position and a lowered position rearwardly beneath said roof member in said lowered position thereof, and a pair of quarter panels is provided between the sides of said rearwindow frame member and a pair of elbow rails forming respectively the rearward side portions of said lower part, said quarter panels being each hinged to the respective side of said rear window frame member and arranged to rest on the respective elbow rail when said rear window frame member is raised and to fold inwardly beneath and slide downwardly and rearwardly with said rear window frame member.

2. A vehicle body having a lower part and an upper part which can be lowered on to said lower part to convert the body from a covered body to an open body, said upper part comprising a roof member and a relatively movable rear window frame member, in which supporting pivoted linkage means are provided including a pair of arms pivoted to and interconnecting the side of said roof member and said lower part, said linkage supporting said roof member for swinging movement between a forward raised position and a rearward lowered position in which said roof member rests on said lower part, said rear window frame member is mounted on said lower part to move between a raised position and a lowered position rearwardly beneath said roof member in said lowered position thereof, and said linkage means also includes, at each side of and within the vehicle body, pivoted link means including a cranked lever pivoted to said lower part, a first pivoted link interconnecting said cranked lever with a respective one of said arms, a thrust rod extending between and pivoted to said cranked lever and the respective lower corner of said rear window frame member, a slotted plate on said roof member, a second pivoted link between said slotted plate and the top of the respective side of said rear window frame member and a rule-jointed pair of links interconnecting said second pivoted link and said respective one of said arms, said pivoted link means being operative to cause said rear window frame member to slide downwardly and rearwardly as said roof member swings rearwardly, or vice versa.

3. A vehicle body having a lower part and an upper part which can be lowered on to said lower part to convert the body from a covered body to an open body, said upper part comprising a roof member and a relatively movable rear window frame member, in which supporting pivoted linkage means are provided including a pair of arms pivoted to and interconnecting the sides of said roof member and said lower part, said linkage supporting said roof member for swinging movement between a forward raised position and a rearward lowered position in which said roof member rests on said lower part, said rear window frame member is mounted on said lower part to move between a raised position and lowered position rearwardly beneath said roof member in said lowered position thereof, and a forward section of said roof member consists of a relatively movable rigid panel carried by a parallel-motion linkage means whereby said panel is mounted to lift and swing rearwardly to rest on rear section of said roof member.

References Cited

UNITED STATES PATENTS

| | | | |
|---|---|---|---|
| 2,957,725 | 10/1960 | Ford | 296—107 |
| 2,833,593 | 5/1958 | Olivier | 296—107 |
| 2,785,922 | 3/1957 | Chika | 296—107 |
| 2,768,024 | 10/1956 | Spear | 296—107 |

PHILIP GOODMAN, Primary Examiner

U.S. Cl. X.R.

296—107